United States Patent [19]

Hiraishi

[11] Patent Number: 4,602,126
[45] Date of Patent: Jul. 22, 1986

[54] TWO-DIMENSIONAL COORDINATE DETECTING APPARATUS

[75] Inventor: Masanori Hiraishi, Hyogo, Japan

[73] Assignee: Diacel Chemical Industries, Ltd., Osaka, Japan

[21] Appl. No.: 507,644

[22] Filed: Jun. 27, 1983

[30] Foreign Application Priority Data

Jun. 25, 1982 [JP] Japan .................. 57-110357
Jul. 5, 1982 [JP] Japan .................. 57-117357
Aug. 6, 1982 [JP] Japan .................. 57-137758

[51] Int. Cl.$^4$ .............................. G08C 21/00
[52] U.S. Cl. ...................................... 178/18
[58] Field of Search ...................... 178/18, 19, 20

[56] References Cited

U.S. PATENT DOCUMENTS 3,906,190 9/1975 Light ............................. 178/18
4,149,029 4/1979 Pobgee ......................... 178/18

Primary Examiner—Stafford D. Schreyer
Attorney, Agent, or Firm—Sughrue, Mion, Zinn, Macpeak & Seas

[57] ABSTRACT

A two-dimensional coordinate detecting apparatus for use, e.g. over a CRT screen, is arranged such that a potential gradient layer is spaced from a detector layer, one of which is formed of a plurality of fragmentary strips. At a depressed position, the potential gradient layer and the detector layer come into contact, and the coordinates of the depressed position can be detected, by, for example, the potential at the depressed portion, or from factors such as the timing of the voltage detection.

4 Claims, 4 Drawing Figures

TWO-DIMENSIONAL COORDINATE DETECTING APPARATUS

BACKGROUND OF THE INVENTION

The present invention relates to an apparatus for detecting coordinates. Conventionally, an apparatus for detecting coordinates on a surface is known, in which conductive films are disposed in parallel and in opposition to each other with a slight space therebetween, and both conductive films are provided with electrodes causing currents to flow into the respective conductive films. This apparatus is arranged, for example, such that the apparatus is placed on a flat surface on which for example a video image is projected and a desired position (coordinate) on the video image is depressed (touched) from above the upper surface of the overlapped conductive films by using, for example, a thin pen point, so that a signal corresponding to the coordinate at the depressed position is derived through the electrodes and inputted to a computer or the like.

This apparatus is, however, disadvantageous in that reliability as well as accuracy in coordinate detection is not so high.

Further, an apparatus has been proposed in which the layers, each having a plurality of conductive portions separated by insulator portions extending in the same direction, are overlapped with a space therebetween such that the conductive portions of one of the layers are perpendicular to the conductive portions of the other layer, the layers being flexible so that they may electrically contact each other when depressed to thereby form a matrix type switching function.

Since in the thus arranged apparatus, two potentials or a set of a potential and a time point corresponding to the coordinate to be detected are detected, the apparatus is disadvantageous in that when the coordinate information is transferred to a computer, the interface for coordinate detection as well as the software for data transmission to the computer are complicated.

When this apparatus is used for detecting two-dimensional coordinates, there is a further disadvantage in that a lot of electrodes are required and therefore the reliability in coordinate detection is low and the resolution power is small.

SUMMARY OF THE INVENTION

An object of the present invention is to eliminate the above-mentioned drawbacks in the prior art apparatus.

Another object of the present invention is to provide a two-dimensional coordinate detecting apparatus comprising a potential gradient layer and a detector layer which are normally disposed separately with a space therebetween and which are sufficiently flexible so as to be locally electrically contacted with each other only when depressed, in which the potential gradient layer is composed of a plurality of fragmentary conductive portions separated by insulator portions extending in the same direction, and the detector layer is constituted by an entirely conductive layer, whereby the fragmentary conductive portions of the potential gradient layer are successively supplied with a voltage or, alternatively, the fragmentary conductive portions are supplied with voltages so as to form potentials different from one another at the respective fragmentary conductive portions, so that the fragmentary conductive portion at the depressed position is detected from the detector layer and at the same time the potential of the fragmentary conductive portion at the depressed position is detected from the detector layer.

A further object of the present invention is to provide a two-dimensional coordinate detecting apparatus comprising a potential gradient layer and a detector layer which are normally separately disposed with a space therebetween and which are sufficiently flexible to locally electrically contact each other only when depressed, in which the potential gradient layer is constituted by an entirely conductive layer provided at its opposite side portions with a pair of electrode portions and the detector layer is constituted by a plurality of fragmentary conductive portions separated by insulator portions extending in parallel to each other and perpendicular to the electrode portions of the potential gradient layer and electrodes provided at one end or opposite ends of each of the respective fragmentary conductive portions, whereby a voltage is supplied across the pair of electrodes of the potential gradient layer so that the potential at the depressed position is detected from the detector layer and at the same time the fragmentary conductive portion at which the potential is detected is detected.

DETAILED DESCRIPTION OF THE PREFERRED EMBODIMENTS

Figure 1:
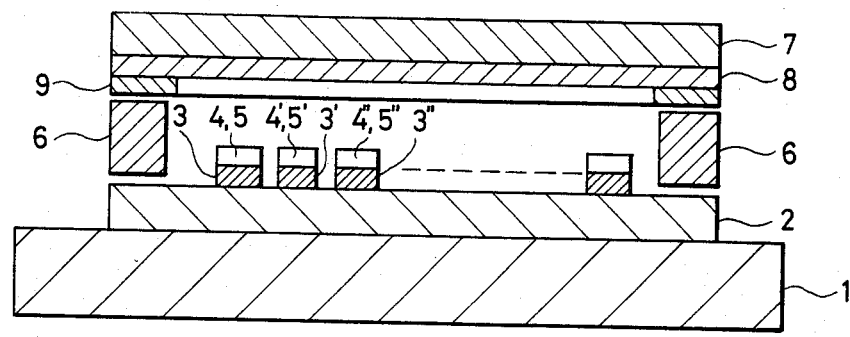
FIG. 1 is a cross-section illustrating a first embodiment of the present invention.

According to the present invention, a conductive layer having a surface resistivity of 0.01 $\Omega/\square \sim 10K\ \Omega/\square$ is generally used as a potential gradient layer. A flexible conductive layer can be obtained by applying a conductive ink such as carbon paste onto a plastic film, by laminating a material such as a film with a metal foil, or by evaporating a conductive material onto a film. In the latter case, particularly, a transparent potential gradient layer can be obtained by depositing a conductive thin film of gold, indium, or tin oxide onto a transparent substrate by evaporation. The potential gradient layer is generally shaped into a rectangle and divided into a plurality of conductive portions each of which is respectively provided at its opposite sides with electrodes. The electrodes may be formed by printing with conductive ink or laminating a metal foil of aluminum or the like onto the potential gradient layer. The division of the potential gradient layer into fragmentary conductive portions is performed generally in a known manner, for example, by printing with carbon paste into a plurality of parallel strips on a film by silk screen method, or by etching a film having an entirely conductive surface to form the shape as mentioned above.

Although the number of fragmentary conductive portions divided from the potential gradient layer may be desiredly selected, the more the better.

The width of each insulation portion and each fragmentary conductive portion may also be desiredly selected. Generally, the smaller the width of each fragmentary conductive portion the more preferable, because higher resolving power for detecting the position coordinate can be obtained. Although it is preferable to make the width of the insulation portion smaller because it will be possible to allow the width of the fragmentary conductive portion to be made larger, there is a risk that two adjacent conductive portions sandwiching an insulation portion therebetween may simultaneously be in electrical contact with a detector layer when a portion in the vicinity of the insulation portion is depressed. However, such a phenomenon may be utilized to process an electric signal to double the resolving power in detecting the position coordinate.

Usually, the width of the respective insulator portions as well as the width of the respective fragmentary conductive portions of a potential gradient layer are made equal, while it is not always necessary to make it so. In the case where the width of the fragmentary conductive portion is sufficiently small, the two-dimensional coordinate detecting apparatus according to the present invention may be used as a coordinate detecting apparatus for indicating graphic coordinates. In the case where the width of the fragmentary conductive portion is large, on the contrary, it may be used as a coordinate detecting apparatus having a switching function of the matrix type.

Generally, the detector layer may be any conductive layer so long as it has a conductivity corresponding to the surface resistivity of 10K $\Omega/\square$ or less, and when the same material as the potential gradient layer or conductive metal foil of, e.g., aluminum is used, it may be made flexible. The electrode of the detector layer may be provided at each of four corners or at one position of the layer. Generally, the detector layer is shaped into a rectangle similarly to the potential gradient layer and formed onto a sufficiently flexible insulator substrate.

In order to provide local electrical contact between the potential gradient layer and the detector layer when depressed, generally, the following methods can be used.

According to a first method, the potential gradient layer and the detector layer are placed in opposition with insulator spacers provided therebetween at their four corners and bonded with an air gap formed therebetween. In a second method, an insulator spacer in the shape of a mesh or dots is formed on the potential gradient layer or the detector layer. In a third method, the two layers are stacked with a pressure-sensitive conductive rubber, such as an anisotropic conductive rubber, or a piezo-electric material sandwiched therebetween. According to a fourth method, where the two-dimensional coordinate detecting apparatus of the present invention is processed to form a curved surface to fit a CRT, the curvature of the potential gradient layer and the detector layer disposed at an outer position is made smaller than that disposed at an inner position.

The two-dimensional coordinate detecting apparatus according to the present invention is arranged as described above, and preferred embodiments will be described hereunder with reference to the following examples.

EXAMPLE 1

The electrodes on one side of the fragmentary conductive portions of a potential gradient layer are successively supplied with a voltage and the electrodes on the other side of the same are commonly grounded. The successive application of voltage may be performed in an ordinary way using a microprocessor. When a point at the stacked portion of the potential gradient layer and the detector layer is depressed, the voltage having a value corresponding to the position of the potential gradient layer is detected from the detector layer. The fragmentary conductive portion depressed at the same time is detected and therefore the two-dimensional coordinate is detected.

According to the present embodiment, it is necessary to position the electrodes outside the surface portion at which the coordinate is detected so that the area in which the potential gradient layer and the detector layer are overlapped does not include any portion of zero potential. In the case where the potential detected from the detector layer is zero, that is, when a portion at the grounded electrode side is depressed, the state is as if in the non-input state.

As described above, the present embodiment is advantageous in that since detection is made in one direction to determine which one of the fragmentary conductive portions is depressed, the reliability of detection is high, and since the voltage at the depressed position is detected in the other direction, the resolving power is large. Accordingly, it is preferable to use this position detecting apparatus in a system such as word processors which particularly require high reliability in the detection of columns.

As shown in FIG. 1, on a substrate 1 of polymethylmethacrylate (about 5 mm thickness), there was stacked a potential gradient layer composed of fragmentary conductive portions 3, 3', 3", ... formed by chemically etching a a transparent thin film made by depositing a thin film layer of gold by evaporation onto a biaxially extruded polyethylene-terephthalate film 2 of 125 $\mu$m thickness. Next, electrodes 4, 4', 4", ... and 5, 5', 5", ... were provided on the opposite ends of each of the fragmentary conductive portions. Next, the stack structure of a detector layer 8 which was formed by depositing indium-tin oxide by evaporation onto a biaxially extruded polyethyleneterephthalate film 7 and which was provided with electrodes 9 at its four corners, was mounted on the structure of the film 2 provided with the fragmentary conductive portions 3, 3', 3", ... with spacers 6 of polycarbonate (0.5 mm thickness) sandwiched therebetween.

As the potential gradient layer, a transparent conductive film was used; INTREX G-34FX produced by Sierracin Corporation having a surface resistivity of about 20 $\Omega/\square$ and a light transmission factor of about 70%. Similarly, as the detector layer, a transparent conductive film was used; INTREX K-HC produced by Sierracin Corporation having a surface resistivity of about 1K $\Omega/\square$ and a light transmission factor of about 80%. The two-dimensional coordinate detecting apparatus according to this embodiment was transparent and had a light transmission factor of about 55%, which was sufficiently transparent to use for a two-dimensional coordinate detecting apparatus to be placed in front of a display device such as a CRT, an EL, a plasma display, or the like.

Next, the electrodes 4, 4', 4", ... were connected to the earth 1, and the electrodes 5, 5', 5", ... were successively supplied with a voltage of 1.25 V. When the film 7 was depressed, the voltage corresponding to the position at which depression was applied was detected from the electrode 9 and the fragmentary conductive portion at the depressed position was detected from the time when the voltage was detected, so that the coordinate of the depressed position could be determined.

EXAMPLE 2

First, in order to make all of a plurality of fragmentary conductive portions potential gradient layers, voltages are supplied to a part of or all the electrodes formed at the opposite sides of the fragmentary conductive portions to provide various potentials which are different from one another in the respective potential gradient layers. When the position at which any one of the potential gradient layers and the detector layer are stacked is depressed, the voltage corresponding to the depressed position is detected from the detector layer.

Thus, one potential can represent a two-dimensional coordinate, and therefore the electronic circuit for the detection of the coordinate is very simple, requiring only a constant voltage source for forming a potential gradient and accompanying parts associated therewith.

Further, the interface for transmitting coordinate information to a computer as well as the computer software are very simple. For example, it is not necessary to provide the conventionally required device for changing over the application of a voltage to the potential gradient layer 4 necessary for the detection of two potentials corresponding to the coordinate to be detected, and, contrary to the system in which one voltage and a time point corresponding to the coordinate to be detected are detected, it is not necessary to provide, in a microprocessor, an integrated circuit for successively supplying a voltage and an OR circuit for detecting the time point of depression. It will suffice in this embodiment to continuously convert one voltage corresponding to the produced two-dimensional coordinate into a digital signal and to continuously transfer the digital signal to the computer regardless of the relation in sequence of data.

This embodiment is characterized in that one potential Vxy detected from the various potentials of a plurality of parallel arranged potential gradient layers is converted into coordinate information (x, y). For example, the voltage Vxy is A/□ converted and transferred to a computer which converts the input information into digital coordinates. Alternatively, the interface may be provided with a microcomputer function so that the voltage information is A/□ converted and then converted into the coordinate information (x, y) in the interface and thereafter transferred to the computer.

The potentials formed at the plural potential gradient layers may take arbitrary values unless any two potential gradient layers have equal potential. For example, the potentials at the respective potential gradient layers may fall within the discrete ranges 0–1 V, 2–3 V, 4–5 V, . . . or within the continuous ranges 0–1 V, 1–2 V, 2–3 V, . . . .

The width of the respective ranges may be different from one another, and it is preferable to set the respective ranges so that the potential increases or decreases continuously or stepwise in the order of arrangement of the potential gradient layers. If such a potential gradient as mentioned above is produced across the electrodes provided at the opposite sides of the respective potential, the potential gradient is formed substantially linearly in the direction of the potential gradient so as to facilitate the detection of coordinates in this direction, because the potential gradient layers are formed by a conductive layer of uniform resistivity.

For the electronic circuit constituting such various potential gradients in the potential gradient layers, a known constant voltage source for stepwisely producing different voltages may be used, and in a simple way, it is sufficient to lead out wires from series connected batteries, and, connect the thus led out lead wires electrically to the eyelet holes of the electrodes with a silver paste or the like. Alternatively, it will suffice to lead out lead wires from the connection points of series connected resistors which are sufficiently low in resistance with respect to that of the potential gradient layers, and which are energized by a voltage applied across the series connection, and the lead wires may be connected to the eyelet holes of the electrodes.

It is not necessary to supply a voltage to the electrodes formed at the opposite sides of each of all the potential gradient layers and, otherwise, a plurality of potential gradient layers having potentials respectively falling in respective ranges different from one another can be formed by connecting two or more potential gradient layers in series and applying a voltage to each of the series connections. Particularly, if all of the potential gradient layers are connected in series and a voltage is supplied from a constant voltage source to opposite ends of the series connection of the potential gradient layers, the two-dimensional coordinate detecting apparatus according to the present invention may be connected to an external electronic circuit using only three lead wires, two for the application of voltage and one led out of the detector layer for transferring the detection signal.

In this case, if the parallel disposed potential gradient layers are connected in series in the order of arrangement, the calculation is conveniently simplified when the detected potential is converted into coordinates. There are two methods of connecting the parallel arranged potential gradient layers in series, one method being such that one end of a potential gradient layer is connected to the other end on the opposite side of an adjacently arranged second potential gradient layer. The other method is such that one end of a potential gradient layer is connected to that end, adjacently disposed on the same side, of an adjacently arranged second potential gradient layer. In the former method, although it is easy to provide correlation and therefore the conversion between the potential to be detected and the coordinates, it is required to lead out lead wires from the electrodes for connecting the same. In the latter case, on the contrary, although the correlation between the potential to be detected and the coordinates is simple, but still more complicated than the former method, it is not necessary to lead out lead wires from the electrodes but the connection between the electrodes are screen-printed with a conductive resin such as silver paste, because the electrodes to be connected are adjacent to each other. In this case, only three lead wires are connected to the potential gradient layer according to the present invention, two for the application of voltage and one for the transfer of the detection signal, thereby simplifying the arrangement and facilitating the production of the same.

As described above, the two-dimensional coordinate detecting apparatus according to this embodiment is advantageous in that the production of the same is easy, the response is fast because the potential corresponding to the depressed position can be instantly produced, the electronic circuit for detection is simple, the production of an interface for inputting digital information relating to the detected coordinates into a computer is simple, and in that the software for data transfer for the computer is also simple.

In the case where both the potential gradient layer and the detector layer are constituted by transparent or semi-transparent conductive layers, the two-dimensional coordinate detecting apparatus according to the present invention is also transparent or semi-transparent so that it may be mounted in front of a display device such as a CRT to instantly attain the coordinate detection of a figure or character displayed on the CRT, resulting in facilitating production of various kinds of systems or software of the interactive or conversation type.

Figure 2:
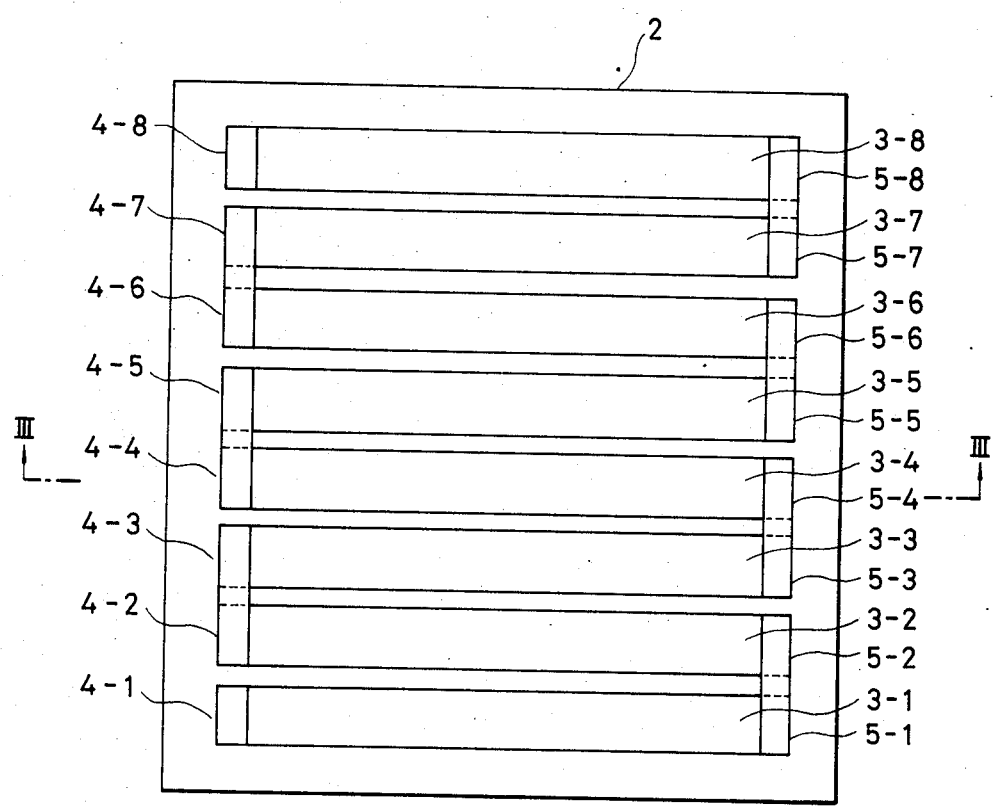
FIG. 2 is a plan view of a second embodiment of the present invention.

As shown in FIG. 2, on a substrate 1 of polymethylmethacrylate (of about 5 mm thickness), there was stacked a potential gradient layer composed of fragmentary conductive portions 3-1, 3-2, ..., 3-8 formed by chemically etching a transparent thin film made by depositing a thin film layer of gold by evaporation onto a biaxially extruded polyethylene-terephthalate film 2 of 125 μm thickness. Next, electrodes 4-1, 4-2, ... 4-8 and 5-1, 5-2, ... 5-8 were provided onto the opposite ends of each of the fragmentary conductive portions. The electrodes 4-2 and 4-3; 4-4 and 4-5; 4-6 and 4-7; 5-1 and 5-2; 5-3 and 5-4; 5-5 and 5-6; and 5-7 and 5-8 are respectively connected.

Figure 3:
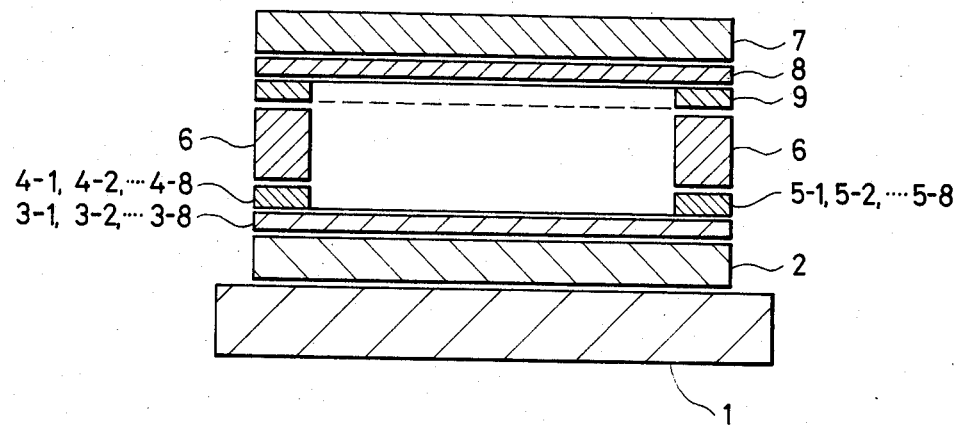
FIG. 3 is a cross-section along the line III—III in FIG. 2.

Next, the stack structure of a detector layer 8 (FIG. 3) formed by depositing indium oxide by evaporation onto a biaxially extruded polyethyleneterephthalate film 7 and which was provided with electrodes 9 at its four corners, was mounted on the structure of the film 2 provided with the fragmentary conductive portions 3-1, 3-2, ... 3-8 with spacers 6 of polycarbonate (0.5 mm thickness) sandwiched therebetween.

As the potential gradient layer, a transparent conductive film was used; SEREX G-34FX produced by DAICEL CHEMICAL INDUSTRIES, CO., LTD. having a surface resistivity of about 20 Ω/□ and a light transmission factor of about 70%. Similarly, as the detector layer, a transparent conductive film was used; SEREX K-EC produced by DAICEL CHEMICAL INDUSTRIES, CO., LTD. having a surface resistivity of about 30K Ω/□ and a light transmission factor of about 80%. The two-dimensional coordinate detecting apparatus according to this embodiment was transparent and had a light transmission factor of about 55%, which was sufficiently transparent to use as a two-dimensional coordinate detecting apparatus to be placed in front of a display device such as a CRT, an EL, a plasma display, or the like.

Next, the electrode 4-1 was grounded and the electrode 4-8 was supplied with a voltage of +8 V. Since the electrodes 5-8 and 5-7; 4-7 and 4-6; 5-6 and 5-5; 4-5 and 4-4; 5-4 and 5-3; 4-3 and 4-2; and 5-2 and 5-1 were connected to each other they had respective equal potentials of 7 V, 6 V, 5 V, 4 V, 3 V, 2 V, and 1 V, respectively. The respective potential gradient layer exhibited linear potential drop.

When the film 7 was depressed, a voltage corresponding to the depressed position was detected from the electrode 9. For example, 1.5 V was detected when the point A in FIG. 2 was depressed.

From this detected voltage value of 1.5 V, it could be found that the center portion of the fragmentary conductive portion 3-2 was depressed, and therefore the two-dimensional coordinate at the depressed position was detected. Thus, the two-dimensional coordinate could be detected by detecting only one voltage value.

EXAMPLE 3

A voltage is applied across the electrodes of a potential gradient layer, one of which is usually grounded.

Equipotential lines are formed between the electrodes. When a point in a portion where the potential gradient layer and a detector layer are overlapped is depressed, a voltage corresponding to the depressed point on the potential gradient layer is detected and at the same time one of the fragmentary conductive portions constituting the detector layer corresponding to the depressed point is also detected, thereby attaining two-dimensional coordinate detection.

To detect the depressed fragmentary conductive portion of the detector, for example, a multi-channel A/D converter may be used.

According to the present embodiment, it is necessary to position the electrodes outside the surface portion on which the coordinates are detected so that the area in which the potential gradient layer and the detector layer are overlapped does not include any portion of zero potential. Otherwise, in the case where the potential detected from the detector layer is zero, that is, when a portion at the grounded electrode side is depressed, the state is as if in the non-input state, As described above, the present embodiment is advantageous in that since the detection is made in one direction to determine which one of the fragmentary conductive portions is depressed, the reliability in detection is high, and since the voltage at the depressed position is detected in the other direction, the resolving power is large. Accordingly it is preferable to use this position detecting apparatus in systems such as word processors, which particularly require high reliability in the detection of columns as noted above.

Figure 4:
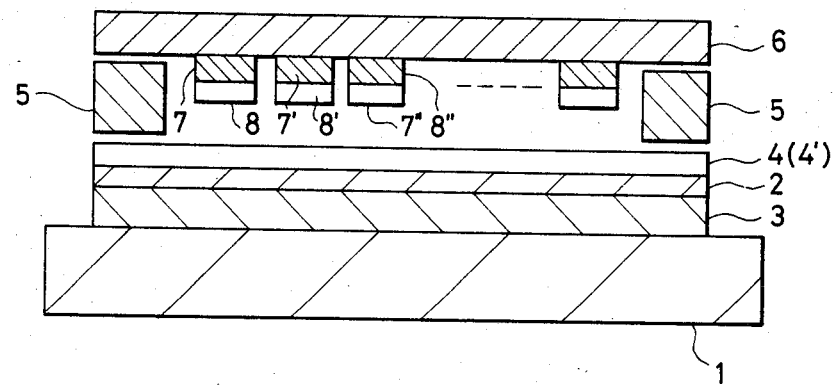
FIG. 4 is a cross-section illustrating a third embodiment of the present invention.

As shown in FIG. 4, on a substrate 1 of polymethylmethacrylate (of about 5 mm thickness), there was stacked a biaxially extruded polyethylene-terephthalate film 3 of 125 μm thickness on which a potential gradient layer 2 formed by a thin film layer of indium-tin oxide was deposited by evaporation. Electrodes 4 and 4' were formed with silver paste at the opposite sides of the potential gradient layer 2. Then, a detector layer was stacked on the structure of the substrate 1 and the potential gradient layer 2 with spacers 5 of carbonate (0.5 mm thickness) sandwiched therebetween, the detector layer being composed of fragmentary conductive portions 7, 7', 7'', ... formed by chemically etching a transparent conductive film made by depositing a thin film layer of gold by evaporation onto a biaxially extruded polyethyleneterephthalate film 6 of 125 μm thickness. Electrodes 8, 8', 8'', ... were formed on one end of each of the fragmentary conductive portions.

As the potential gradient layer, a transparent conductive film was used; SEREX K-EC produced by DAICEL CHEMICAL INDUSTRIES, CO., LTD having a surface resistivity of about 350 Ω/□ and a light transmission factor of about 80%. Similarly, as the detector layer, a transparent conductive film, SEREX G-34FX produced by DAICEL CHEMICAL INDUSTRIAL CO., LTD was used, having surface resistivity of about 20K Ω/□ and a light transmission factor of about 70%. The two-dimensional coordinate detecting apparatus according to this embodiment was transparent and had a light transmission factor of about 55%, which was sufficiently transparent to use as a two-dimensional coordinate detecting apparatus for placement in front of a display device such as a CRT, an EL, a plasma display, or the like.

Next, the electrode 4' was grounded and the electrode 4 was supplied with a voltage of +5 V. When the film 6 was depressed, the potential of the potential gradient layer corresponding to the depressed position was detected from the electrode of the fragmentary conductive portion of the detector corresponding to the depressed position, so that the coordinate at the depressed position could be determined.

What is claimed is:

1. A two-dimensional coordinate detecting apparatus, comprising; a potential gradient layer and a detector layer which are normally separately disposed with a space therebetween and which are sufficiently flexible to enable local electrical contact with each other only when depressed, said potential gradient layer comprising a plurality of fragmentary conductive portions separated by insulator portions and each extending in the same direction, and said detector layer comprising a conductive layer, the fragmentary conductive portions of said potential gradient layer being successively supplied with a voltage so that the fragmentary conductive portion at a depressed position is detected from said detector layer, and, at the same time, the potential of the fragmentary conductive portion at the depressed position is detected from said detector layer.

2. The apparatus of claim 1 wherein said fragmentary conductive portions comprise a thin film layer of gold deposited by evaporation onto a biaxially extruded polyethyleneterphthalate film.

3. The apparatus of claim 1 wherein said detector layer comprises an indium-tin oxide deposited by evaporation onto a biaxially extruded polyethylene-terphthalate film.

4. The apparatus of claim 1 wherein said potential gradient layer comprises a transparent conductive film having a surface resistivity of about 20 $\Omega/\square$ and a light transmission factor of about 70%.

* * * * *